(12) United States Patent
Miller

(10) Patent No.: US 9,421,410 B1
(45) Date of Patent: Aug. 23, 2016

(54) EXERCISE DEVICE

(76) Inventor: Jason S. Miller, Las Vegas, NV (US)

( * ) Notice: Subject to any disclaimer, the term of this patent is extended or adjusted under 35 U.S.C. 154(b) by 411 days.

(21) Appl. No.: 13/357,292

(22) Filed: Jan. 24, 2012

(51) Int. Cl.
A63B 21/00 (2006.01)

(52) U.S. Cl.
CPC .................................... A63B 21/00 (2013.01)

(58) Field of Classification Search
CPC ........................................................ A63B 21/00
USPC ............ 482/121, 126, 93, 99, 100, 102, 107, 482/108, 109
See application file for complete search history.

(56) References Cited

U.S. PATENT DOCUMENTS

| 3,351,346 | A |   | 11/1967 | Strahan |         |
|-----------|---|---|---------|---------|---------|
| 3,414,260 | A |   | 12/1968 | Gust    |         |
| 3,502,329 | A | * | 3/1970  | Brazier | 482/109 |
| 4,537,394 | A | * | 8/1985  | Golinsky, Jr. | 482/109 |
| 4,641,836 | A | * | 2/1987  | Clifton | 482/109 |
| 5,312,308 | A | * | 5/1994  | Hamilton et al. | 482/44 |
| D428,461  | S |   | 7/2000  | Koszalinski |    |
| 6,155,957 | A | * | 12/2000 | Worley et al. | 482/8 |
| 7,175,575 | B1 |  | 2/2007  | Dantolen |       |
| D566,205  | S |   | 4/2008  | Oates   |         |
| D573,670  | S |   | 7/2008  | Mullins |         |
| 8,038,578 | B2 | * | 10/2011 | Olrik et al. | 482/8 |
| 2007/0184946 | A1 | * | 8/2007 | Kuhagen | 482/110 |
| 2008/0051263 | A1 | * | 2/2008 | Rasmussen et al. | 482/94 |

* cited by examiner

Primary Examiner — Jerome W Donnelly
(74) Attorney, Agent, or Firm — Greenberg Traurig, LLP

(57) ABSTRACT

An exercise device comprising an elongated member having a handle at a first end and weight-affixing unit at a second end. The weight-affixing unit may be adjusted longitudinally. Multiple interchangeable handles provide means for conducting various different exercises which target different forearm muscles. The exercise device allows a user to exercise muscles in their forearms which have long been difficult to isolate. One method of using the exercise device comprises a user, while seated, (i) resting his or her forearm on his or her thigh such that the wrist rests on the knee while the hand extends therefrom while gripping the handle of the exercise device with the weight-affixing unit off of the ground; and (ii) lifting and lowering with the wrist repeatedly the weights using said handle.

13 Claims, 4 Drawing Sheets

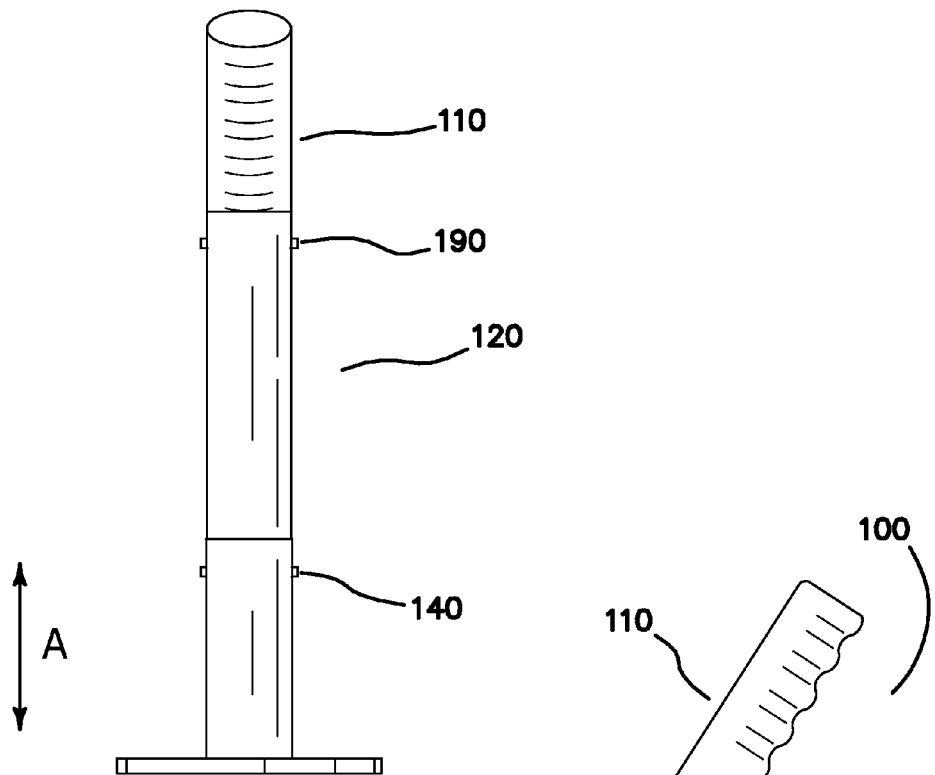
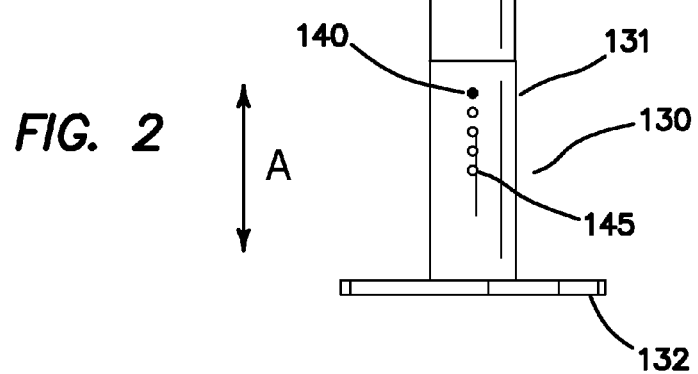

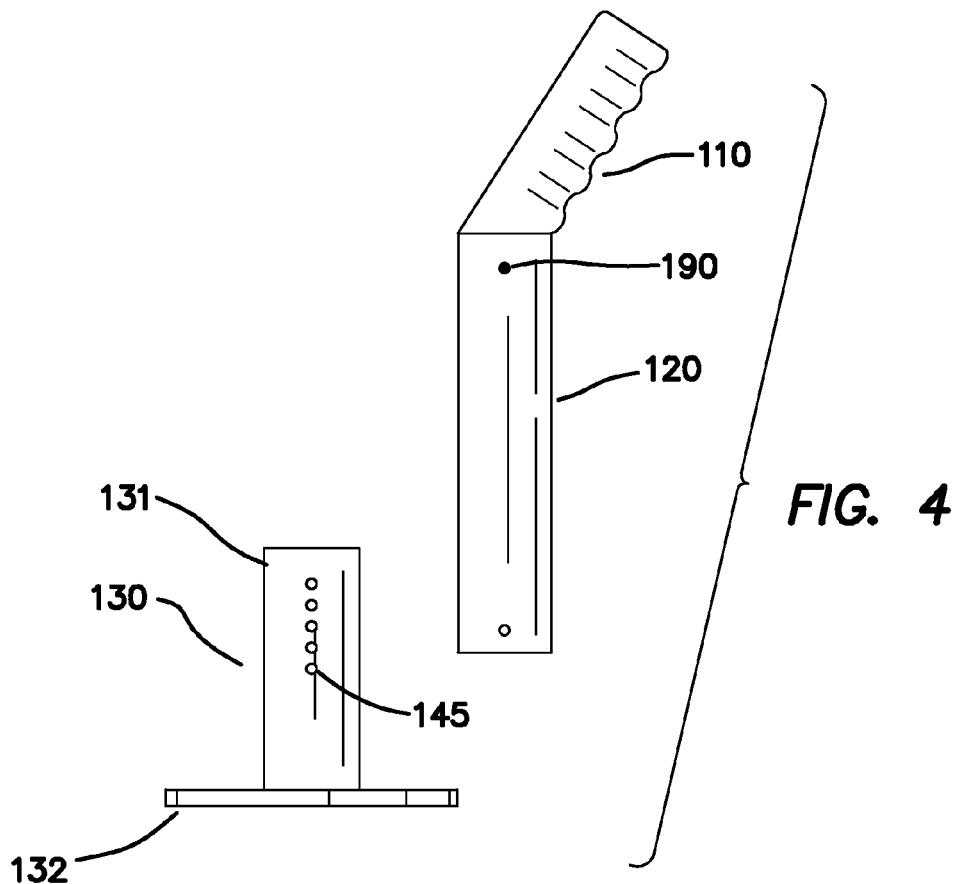
FIG. 4
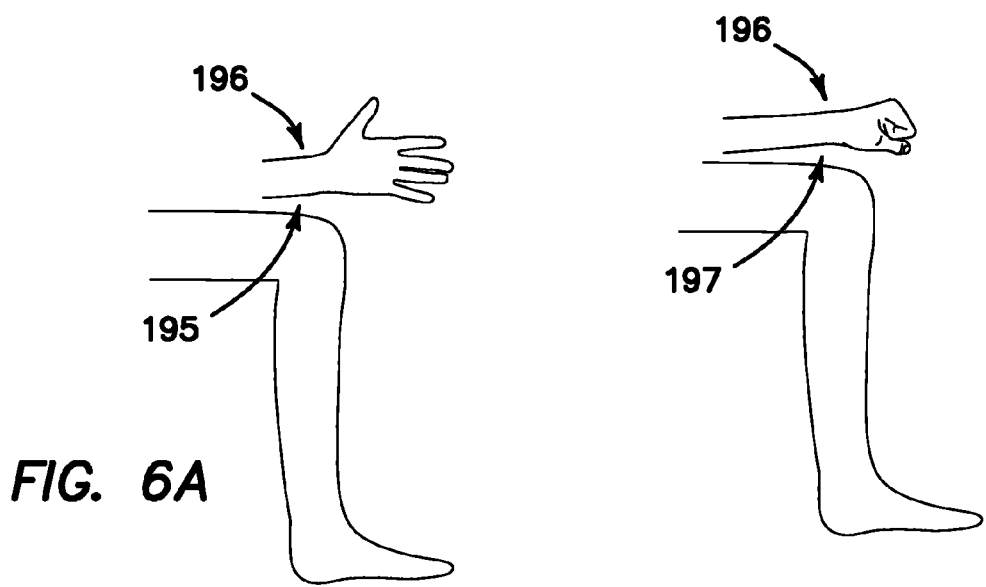
FIG. 6A
FIG. 6B

EXERCISE DEVICE

FIELD OF THE INVENTION

The embodiments of the present invention relate to an exercise device for working at least the forearms of a user.

BACKGROUND

Muscle training is one form of exercise which attracts large numbers of people. Despite the sheer numbers of exercise devices, certain muscle groups remain difficult to isolate with conventional weight machines and devices. Moreover, certain exercise devices are cumbersome and difficult to use.

Accordingly, it would be advantageous to develop an exercise device able to target at least a user's forearm. Advantageously, the exercise device should be easy to use and mobile.

SUMMARY

The embodiments of the present invention relate to an exercise device comprising an elongated member having a handle at a first end and weight-affixing unit at a second end. The weight-affixing unit may be adjusted longitudinally to create additional resistance without the addition of extra weights. In one embodiment, circular weights are configured for attachment to the weight-affixing unit of the exercise device. Multiple interchangeable handles provide means for conducting various different exercises which target different forearm muscles.

In one embodiment, the exercise device allows a user to exercise muscles in their forearms which have long been difficult to isolate. One method of using the exercise device comprises a user, while seated, (i) resting his or her forearm on his or her thigh such that the wrist rests on the knee while the hand extends therefrom while gripping the handle of the exercise device with the weight-affixing unit off of the ground; and (ii) lifting and lowering with the wrist repeatedly the weights using said handle. Different handles dictate the orientation of the forearm on the thigh so that different forearm muscles can be targeted.

In one embodiment, the exercise device may include an integrated timer and/or counter for keeping track of how long the user exercises and/or the number of repetitions the user undertakes.

Other variations, embodiments and features of the present invention will become evident from the following detailed description, drawings and claims.

BRIEF DESCRIPTION OF THE DRAWINGS

FIG. 1 illustrates a front view of an exercise device according to the embodiments of the present invention;

FIG. 2 illustrates a side view of the exercise device according to the embodiments of the present invention;

FIG. 4 illustrates the weight-affixing unit disengaged from the elongated member 120 according to the embodiments of the present invention;

FIGS. 6A-6B illustrate a user demonstrating different uses of the exercise device according to the embodiments of the present invention.

DETAILED DESCRIPTION

Figure 3A:
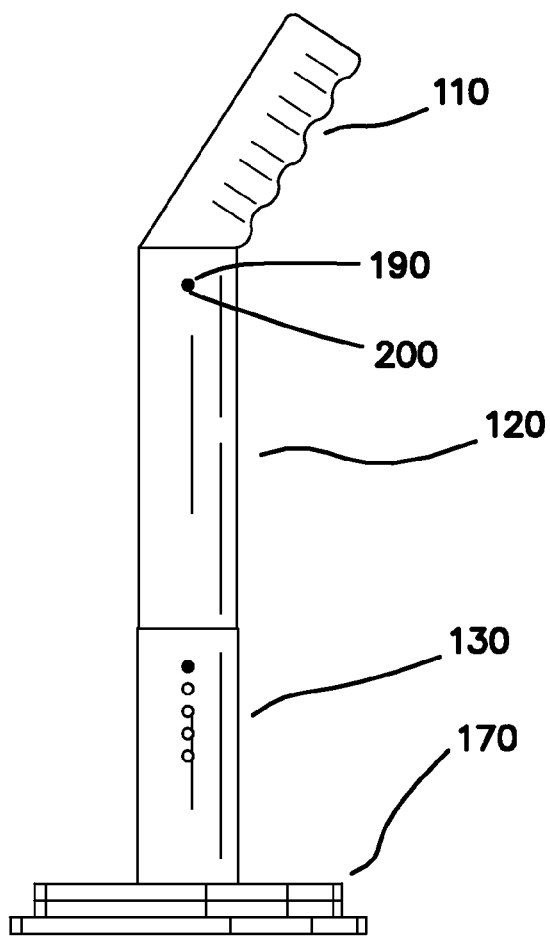
FIGS. 3A and 3B illustrate a side view of the exercise device with the weight-affixing unit supporting weights according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

FIGS. 1 and 2 shows an exercise device 100 broadly comprising a handle 110, an elongated, at least partially hollow, member 120 and weight-affixing unit 130. The weight-affixing unit 130 includes a post 131 dimensioned to be telescopically received by said elongated member 120 and weight platform 132. Dotted line L shows the post 131 inserted into the elongated member 120. As shown, the telescopic relationship between the elongated member 120 and post 131 allows the weight-affixing unit 130 to adjust longitudinally relative to the elongated member 120. By so doing, the user may increase the resistance (i.e., moving the weight away from the user increases the difficulty of lifting the exercise device and weights attached thereto) or allowing additional weights to be placed on the weight platform 132.

As shown, the weight-affixing unit 130 adjusts longitudinally via spring-biased pins 140 supported by the post 131 which mate with openings 145 in the elongated member 120. Arrow A in FIGS. 1 and 2 shows the direction of longitudinal movement of the weight-affixing unit 130 relative to the elongated member 120. In another embodiment, the elongated member 120 may be received by the post 131, being at least partially hollow, such that spring-biased pins supported by the elongated member 120 mate with corresponding openings in the post 131. Those skilled in the art will recognize that other means including, for example, a threaded connection between the elongated member 120 and post 131 may facilitate longitudinal adjustment of the weight-affixing unit 130 relative to the elongated member 120. FIG. 4 shows the weight-affixing unit 130 disengaged from said elongated member 120.

Figure 3B:
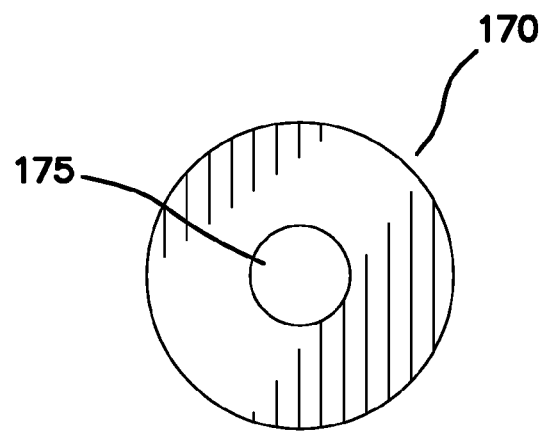

FIGS. 3A and 3B show the weight-affixing unit 130 and circular weights 170. In one embodiment, the circular weights 170 include a central bore 175 configured for receipt by the post 131 when the weight-affixing unit 130 is disengaged from the elongated member 120. In another embodiment, the circular weights include a slot allowing them to be slipped directly on the weight platform 132 with the slot accepting the post 131. Those skilled in the art will recognize that other means, including magnets, clips, locks, hook and loop fasteners and slots, may be used to secure or receive the weights to the weight-affixing unit 130.

Figure 5A:
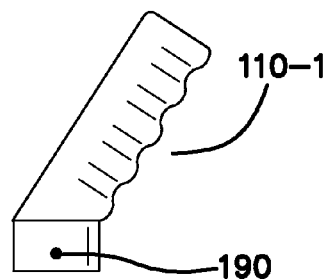
FIGS. 5A-5C illustrate three handles according to the embodiments of the present invention.
Figure 5B:
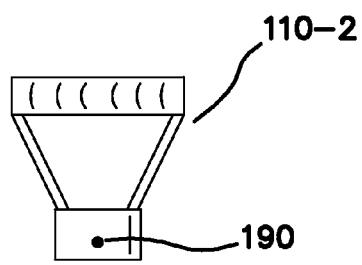
Figure 5C:
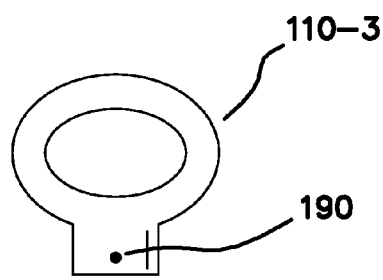

The exercise device 100 is configured to receive multiple handles 110-1 through 110-3, as shown in FIGS. 5A-5C. Like said weight-affixing unit 130 and elongated member 120, spring-biased pins 190 facilitate the engagement and disengagement of the handles 110-1 through 110-3 and elongated member 120. In one embodiment, the spring-biased pins 190 mate with a pair of openings 200 in the upper section of the elongated member 120. A threaded relationship may also facilitate engagement and disengagement of the handles 110-1 through 110-3 from the elongated member 120. The different handles 110-1 and 110-3 cause different user hand positions thereby targeted different forearm muscles. Each handle 110-1 through 110-3 includes a block member 111 configured for insertion into the upper section of the elongated member 120 wherein said block member 111 supports spring-biased pins 190.

FIGS. 6A-6B shows how the exercise device 100 may be used to isolate the forearm muscles. In general, such use comprises a user, while seated, (i) resting his or her forearm on his or her thigh such that the wrist rests on the knee while the hand extends therefrom while gripping the handle 110 of the exercise device 100 with the weight-affixing unit 130 elevated off of the ground; and (ii) lifting and lowering repetitively the weights 170 using said handle 110. The motion is substantially about the user's wrist thereby exercising the forearm muscles. The difference facilitated by the different handles 110-1 through 110-3 is the orientation of the forearm. An outer surface 195 of the forearm 196 rests against the thigh when using handle 110-1 while an upper surface 197 of the forearm 196 rests against the thigh when using the handle 110-2. Accordingly, with handle 110-1 the user's wrist is lifting upward in a direction of the thumb while with handle 110-2 the wrist is lifting upward in a direction of the palm.

Figure 7:
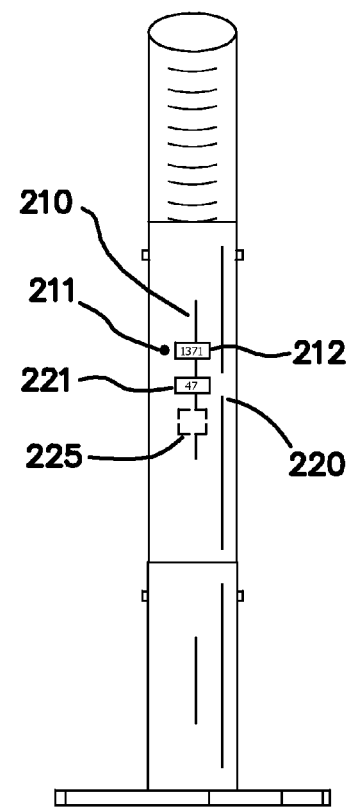
FIG. 7 illustrates a timer and counter integrated with the exercise device according to the embodiments of the present invention.

FIG. 7 shows a timer 210 and counter 220 module integrated into the elongated member 120. The timer 210 includes an on/off button 211 and LED, LCD, segmented or similar display unit 212. The counter 220 is configured to track repetitions/cycles of the exercise device 100. In one embodiment, an accelerometer or similar motion-based sensor 225 (dotted lines as sensor 225 is within the elongated member 120) is linked to the counter 220 such that each sensed raising of the exercise device 100 causes a counter display 221 to increment by one. The timer on/off button 221 may operate the counter 220 as well or the counter 220 may have a separate on/off switch.

Although the invention has been described in detail with reference to several embodiments, additional variations and modifications exist within the scope and spirit of the invention as described and defined in the following claims.

I claim:

1. An exercise device comprising:
   an elongated member;
   a single, elongated hand receiving handle removably inserted into one end of said elongated member, said handle inserted such that said single hand receiving handle extends at an angle relative to said elongated member; and
   a weight-affixing unit adjustably attached to a second end of said elongated member, said weight-affixing unit configured to receive and secure one or more weights on a weight platform at a bottom thereof, said weight-affixing unit removable from said adjustable attachment with said elongated member permitting weights to be placed on said weight-affixing unit and said weight-affixing unit re-attachable to said elongated member with said weights in place.

2. The exercise device of claim 1 wherein said weight affixing unit is longitudinally adjustable relative to said elongated member.

3. The exercise device of claim 1 further comprising a timer integrated therewith and configured to display a time associated with use of the exercise device.

4. The exercise device of claim 1 further comprising a counter integrated therewith and configured to display a number of reps associated with use of the exercise device.

5. The exercise device of claim 4 further comprising an accelerometer integrated therewith and configured to count a number of reps associated with use of the exercise device.

6. An exercise system comprising:
   an elongated member;
   multiple removable handles, each handle having varied form and configured for engagement and disengagement with one end of said elongated member;
   a weight-affixing unit attached to a second end of said elongated member, said weight-affixing unit configured to receive and secure one or more weights, said weight-affixing unit removable from said adjustable attachment with said elongated member permitting weights to be placed on said weight-affixing unit and said weight-affixing unit re-attachable to said elongated member with said weights in place.

7. The exercise device of claim 6 further comprising a timer integrated therewith and configured to display a time associated with use of the exercise device.

8. The exercise device of claim 6 further comprising a counter integrated therewith and configured to display a number of reps associated with use of the exercise device.

9. The exercise device of claim 6 further comprising an accelerometer integrated therewith and configured to count a number of reps associated with use of the exercise device.

10. An exercise system comprising:
    an elongated member;
    a single, elongated hand receiving handle removably inserted into one end of said elongated member, said handle inserted such that said single hand receiving handle is at an angle relative to said elongated member;
    a weight-affixing unit attached to a second end of said elongated member, said weight-affixing unit configured to receive and secure one or more weights on a weight platform at a bottom thereof, said weight-affixing unit removable from said adjustable attachment with said elongated member permitting weights to be placed on said weight-affixing unit and said weight-affixing unit re-attachable to said elongated member with said weights in place; and
    wherein said weight-affixing unit telescopes along said elongated member allowing a position of said weight-affixing unit to be adjusted.

11. The exercise device of claim 10 further comprising a timer integrated therewith and configured to display a time associated with use of the exercise device.

12. The exercise device of claim 10 further comprising a counter integrated therewith and configured to display a number of reps associated with use of the exercise device.

13. The exercise device of claim 10 further comprising an accelerometer integrated therewith and configured to count a number of reps associated with use of the exercise device.

* * * * *